Nov. 12, 1963     G. F. PICKENS     3,110,240
MANUAL OVERRIDE FOR PHOTOELECTRIC EXPOSURE CONTROL IN CAMERA
Filed Aug. 9, 1961

GERALD F. PICKENS
INVENTOR.

BY
ATTORNEYS

United States Patent Office 3,110,240
Patented Nov. 12, 1963

3,110,240
MANUAL OVERRIDE FOR PHOTOELECTRIC
EXPOSURE CONTROL IN CAMERA
Gerald F. Pickens, Rochester, N.Y., assignor to Eastman
Kodak Company, Rochester, N.Y., a corporation of
New Jersey
Filed Aug. 9, 1961, Ser. No. 130,302
1 Claim. (Cl. 95—64)

The present invention relates to cameras having photoelectric exposure control systems and more particularly concerns means for manually overriding the photoelectric control and for selectively setting the exposure regulating system.

It is a primary object of the present invention to provide a simple, inexpensive and rugged manual override device for a photoelectric exposure control system.

A more specific object of the invention is to manually override the action of a photoelectric exposure control system by engagement between a manually controlled, open-ended, box cam member and a movable part of the photoelectrically controlled system, regardless of the position of the latter at the time of such engagement.

Figure 1:
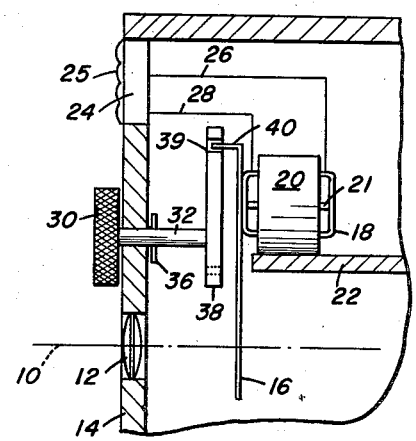
Figure 2:
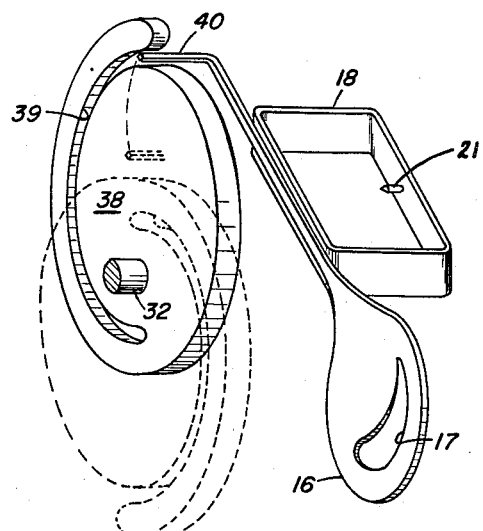

Other objects of the invention will appear from the following description, reference being made to the accompanying drawings, wherein:

FIG. 1 is a sectional right side view of a portion of a camera showing the invention; and FIG. 2 is an isometric view of the cam disk and the abutment member when the latter is in its position for entering the cam slot of the latter.

Referring to FIG. 1, a typical camera embodying the present invention has a taking lens axis 10 on which is disposed a lens system, illustrated at 12, supported by a front cover or other frame member 14 of the camera. An exposure regulating member, illustrated in FIG. 2 as a diaphragm vane 16, and which may be of the type disclosed in U.S. Patent 2,163,737 to Prinsen, crosses the lens axis and may be moved for varying the alignment of a tapered vane aperture 17 with the lens axis, thereby varying the exposure aperture in a manner well known in the art. Vane 16 is secured to a movable, e.g., deflectable coil 18 of an electric measuring instrument 20. The coil 18 is pivoted about an axis 21 and is energized by a photocell 24 through electric leads 26 and 28. The photocell is positioned in the camera front for exposure to field light through a lens block 25, and energizes the instrument coil 18 as a function of field brightness, thereby automatically positioning the diaphragm vane 16 and its aperture 17 for regulating exposure of film in the camera.

A knurled knob 30, secured to a shaft 32, is disposed outside of the front camera cover 14 for access by the camera operator. Shaft 32 extends through a suitable bearing in cover 14 and is secured to a disk 36. Disk 36 and knob 30 are in frictional engagement with opposite sides of cover member 14 and maintain shaft 32 in any angular position where it is placed by angular movement of knob 30. A cam disk 38, which has an open-ended spiral slot 39, forming a box cam, is mounted on shaft 32 for angular movement therewith. When knob 30 is in its counterclockwise or retracted position (as viewed from the front of the camera) the cam disk 38 lies outside the path of a spring abutment member 40, which is integral with vane 16 or is otherwise secured to coil 18. In this relative position of the elements, the spring abutment member 40 is movable through the path shown in FIG. 2, in response to movement of vane 16 for automatically regulating exposure. The counterclockwise position of disk 38 is indicated in broken outline in FIG. 2.

In order to regulate exposure manually, knob 30 is moved clockwise, thereby moving disk 38 clockwise through the position shown in solid lines in FIG. 2, where abutment member 40 enters slot 39. Further clockwise movement of disk 38 moves abutment member 40, as well as coil 18 and vane 16 counterclockwise for setting the latter to any desired position.

The invention has been described in detail with particular reference to preferred embodiments thereof, but it will be understood that variations and modifications can be effected within the spirit and scope of the invention as described hereinabove and as defined in the appended claim.

I claim:

In a camera having a photoelectric exposure control system including an exposure regulating device angularly deflectable about a pivot within a predetermined deflection range, as a function of field brightness, means for regulating exposure manually, comprising in combination:

a cam following abutment member angularly movable through an arc with said exposure regulating device within said deflection range;

a shaft;

a knob fixed to said shaft and accessible to the camera operator, said knob being adapted for angularly moving said shaft; and a cam disk eccentrically fixed to said shaft for angular movement therewith and having an open-ended cam slot eccentric with respect to said shaft and adapted for engaging said abutment member, said cam disk having a retracted angular position lying outside the deflection range of said abutment member and a camming range of angular positions within which said abutment member is engaged by said slot and is positioned within said deflection range as a function of the intersection of said cam slot with said arc.

References Cited in the file of this patent
UNITED STATES PATENTS
2,923,170    Pfaffenberger _____ Feb. 2, 1960